United States Patent [19]
Regen et al.

[11] Patent Number: 5,191,602
[45] Date of Patent: Mar. 2, 1993

[54] CELLULAR TELEPHONE HEADSET

[75] Inventors: Paul L. Regen, Felton; Marv Tseu, Salinas, both of Calif.

[73] Assignee: Plantronics, Inc., Santa Cruz, Calif.

[21] Appl. No.: 639,430

[22] Filed: Jan. 9, 1991

[51] Int. Cl.$^5$ .................... H04M 11/00; H04M 1/00
[52] U.S. Cl. ........................... 379/58; 379/63; 379/419; 379/428; 379/430
[58] Field of Search ............... 379/56, 58, 59, 61, 379/63, 419, 428, 430

[56] References Cited

U.S. PATENT DOCUMENTS

| | | | |
|---|---|---|---|
| 4,558,178 | 12/1985 | Yasuda et al. | 379/430 |
| 4,591,661 | 5/1986 | Benedetto et al. | 379/63 |
| 4,930,156 | 5/1990 | Norris | 379/388 |
| 4,972,457 | 11/1990 | O'Sullivan | 379/59 |
| 4,991,197 | 2/1991 | Morris | 379/58 |

FOREIGN PATENT DOCUMENTS

| | | | |
|---|---|---|---|
| 2159336 | 11/1985 | United Kingdom | 379/430 |
| 2198612 | 6/1988 | United Kingdom | 379/430 |

OTHER PUBLICATIONS

Telephony, "Portable Phone", p. 76, Mar. 16, 1987.
Teleconnect, "Head Sets", p. 88, Jul. 1987.
Plantronics, "The Mobil Star Cellular Headset", Nov. 1990, #45-01-00.
Teleconnect, "Cellular Headset", p. 119, Mar. 1991.

Primary Examiner—Curtis Kuntz
Assistant Examiner—William Cumming
Attorney, Agent, or Firm—Arnold, White & Durkee

[57] ABSTRACT

A telephone headset apparatus for use with an existing cellular telephone. The headset apparatus is modularly connectable to the existing cellular telephone system, and no electrical or mechanical modification of the existing telephone system is required. A "handset primacy" feature of the headset apparatus ensures that normal handset operation of the cellular telephone system is unaffected by the installation of the headset apparatus. In addition, the handset may remain resting in its cradle even while the headset is operated. A slave unit connects with the cellular telephone's transceiver unit, and a headset control unit connects both the headset and handset to the slave unit. The headset control unit contains a pushbutton for selecting headset operation, as well as a volume control dial for controlling the volume of sound reproduced by the headset's earpiece. The slave unit contains circuitry for controlling whether the handset, the headset, or both, are to be coupled to the telephone transmitting and receiving voice signal lines. The slave unit further contains circuitry for disabling the speaker-phone, if any, in the existing cellular telephone system when the headset is operational. A mounting tray inserts between the cellular telephone's cradle and mounting pedestal, keeping the headset control unit in an accessible location. Clips on the underside of the mounting tray allow excess lengths of headset cable to be safely and neatly stored. A retaining ring on the mounting tray provides a convenient resting area for the headset when it is not is use.

11 Claims, 10 Drawing Sheets

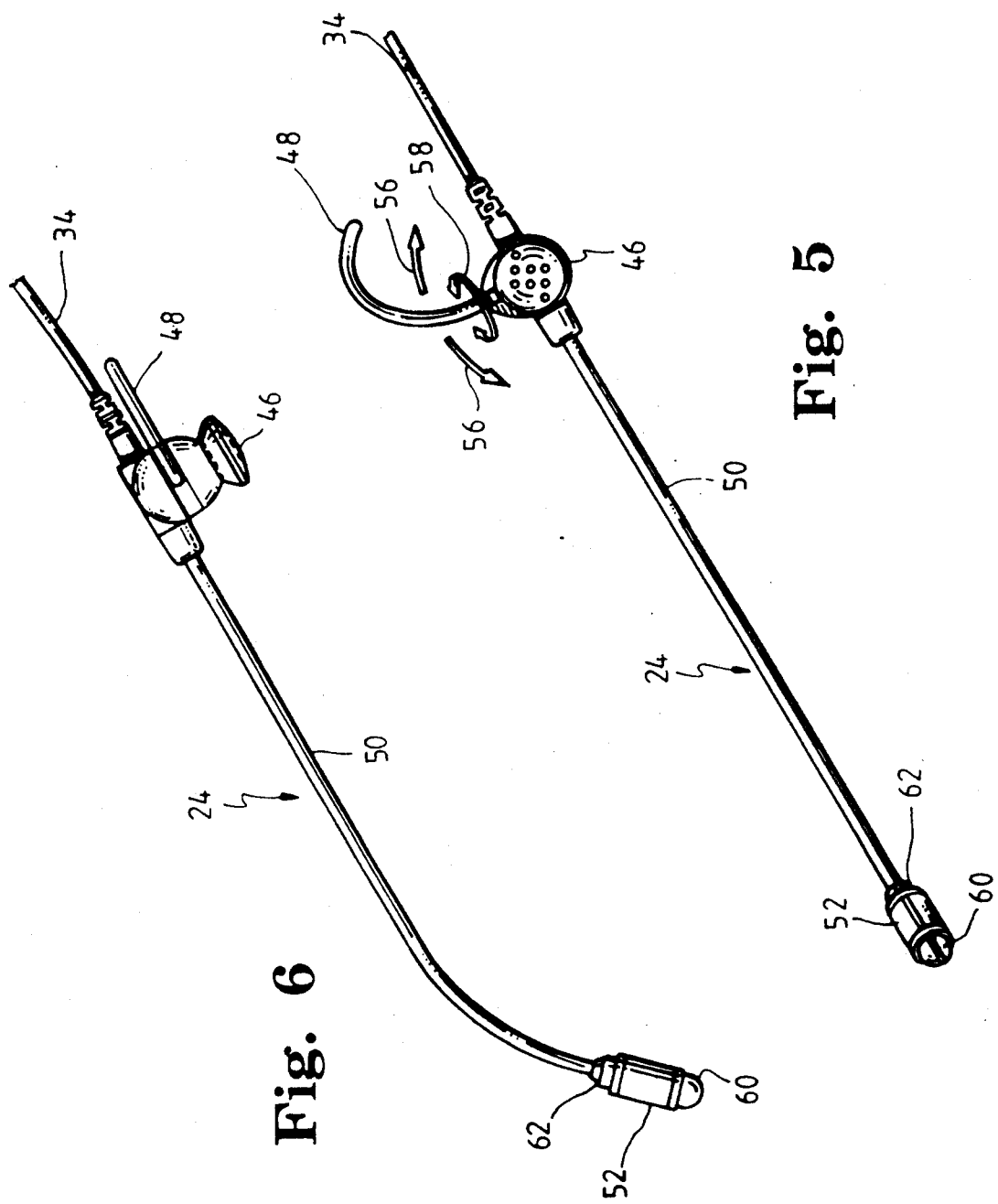

CELLULAR TELEPHONE HEADSET

FIELD OF THE INVENTION

This invention relates generally to the field of telephony, and more particularly to a telephone headset apparatus for use with mobile cellular telephones.

BACKGROUND OF THE INVENTION

Cellular telephones are small, lightweight telephone units which do not require a hardwired connection with a telephone switching station. Instead, cellular telephones communicate with a network of transmitting/receiving stations via radio-frequency transmissions, allowing them to be used in any location that is in close enough proximity to the nearest receiving/transmitting station that the telephone can receive signals from that station and transmit signals to that station. All telephones within a certain area around a transmitting/receiving station will communicate with that station, and this area is called a "cell". If a cellular telephone is moving while in use, such as when it is being used in an automobile, the telephone may cross the boundary between one cell and another. In this case, communication between the telephone and the new cell's transmitting/receiving station is automatically established, and the transmitting/receiving station of the old cell is no longer involved in the communication.

Recent advances in electronics and increases in the number of transmitting/receiving station cells have led to a large increase in cellular telephone usage. A 1984 market study indicated that at that time, 94,000 cellular telephones were in operation. A 1987 study estimated that the number of cellular telephone users had grown to more than one million, and by 1990 there were an estimated four million telephone subscribers. More recent market research projects that within the next ten years, the cellular telephone market will reach thirty-six million subscribers.

One known problem with cellular telephones is that of poor sound and signal transmission quality as compared, for example, with convnetional telephones. Since cellular telephones communicate via radio-frequency, they are susceptible to the same sorts of interference and signal degradation phenomena as are encountered with ordinary television and radio transmissions. In addition, the noisy environment of an automobile, where cellular telephones are frequently used, further tends to degrade the sound quality for the user.

Another known difficultly with cellular telephones, especially in the automobile setting, is that the user must be able to operate and hold the telephone while driving. This makes the cellular telephone a potentially serious traffic hazard, since the driver must direct his attention to the road and the telephone at the same time, and may have to use only one hand for driving, thereby reducing his maneuverability. The user may keep his hands free for driving by holding the telephone between his head and shoulder, but this is an awkward position which similarly reduces the driver's maneuverability and also tends to be uncomfortable. One common solution to this problem is to provide the cellular telephone with "speaker-phone" capability, so that the user need not hold to phone while carrying on a phone conversation. However, using a speaker-phone in the automobile environment greatly aggravates the aforementioned problems of signal quality, since a speaker-phone microphone is necessarily less directional than a telephone handset microphone, and therefore normally much more sensitive to extraneous environmental noises, such as passing trucks, traffic, engine drone, and wind. Another drawback of the speaker-phone solution is that the user has no privacy during his telephone conversation; other passengers in the automobile, for example, can hear both parties in the telephone conversation.

SUMMARY OF THE INVENTION

It is accordingly an object of the present invention to provide a cellular telephone apparatus which has the advantages of safety and comfort afforded by a hands-free speaker-phone while at the same time retaining the advantages of sound quality and privacy afforded by a conventional telephone handset.

It is a further object of the present invention to provide a cellular telephone apparatus which may be installed in existing cellular telephone systems, including those already capable of speaker-phone operation, without modification of the components of the existing cellular telephone, and which does not interfere with normal operation of the cellular telephone system.

These and other objects of the present invention are achieved with a headset apparatus designed to be modularly coupled within an existing cellular telephone system. The headset is fitted to the user's ear, and includes a flexible microphone boom which extends around the user's head from ear to mouth. The microphone is highly directional, and configured such that ambient noise transmission is reduced. A "slave" unit containing electronic circuitry provides a transparent interface between the headset apparatus and the existing cellular telephone system. The slave unit further contains circuitry for disabling the speaker-phone portion of the existing cellular telephone system whenever the headset apparatus is turned on. A headset control unit attaches modularly to the slave unit; the control unit contains a volume control for the headset's earpiece, and a button for switching the headset apparatus on and off. The headset apparatus is operable regardless of whether the cellular telephone handset if removed from its cradle or not, and the handset remains operable in its normal fashion regardless of whether the headset apparatus is on or off. A mounting tray for the control unit attaches to the cellular telephone's pedestal, allowing the control unit to be within convenient reach of the user. The mounting tray also includes a clip for storing the headset in a readily accessible place when not in use, and a clip for holding any excess length of wire between the headset control unit and the headset.

BRIEF DESCRIPTION OF THE DRAWINGS

FIG. 5 is a diagram showing a top view of the headset of FIG. 2;

FIG. 6 is a diagram showing a side view of the headset of FIGS. 2 and 5;

DETAILED DESCRIPTION OF A SPECIFIC EMBODIMENT OF THE INVENTION

Figure 1:
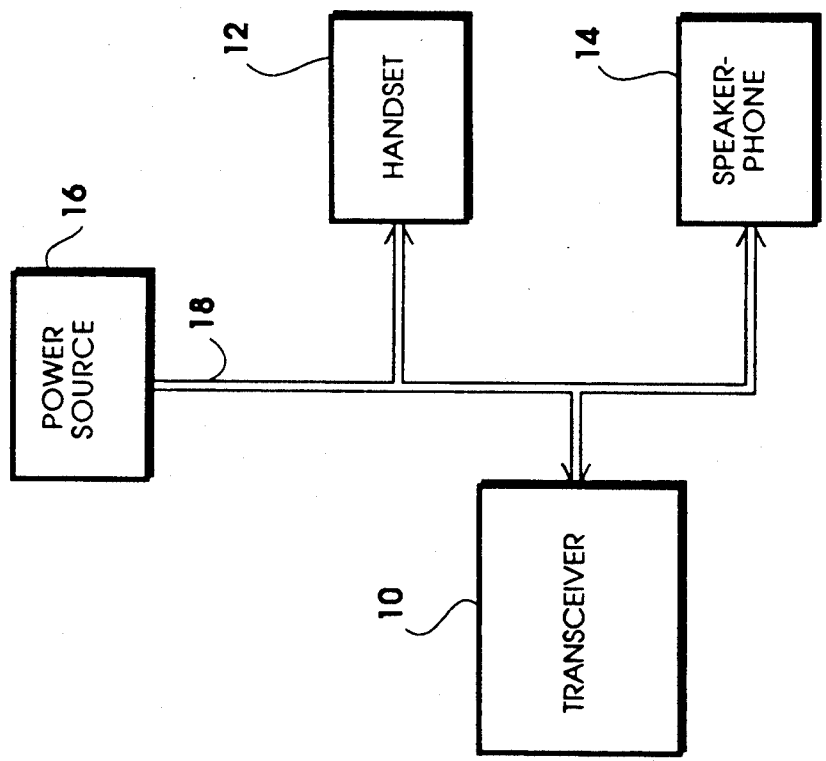
FIG. 1 is a block diagram showing a typical configuration of a cellular telephone of the prior art.

Referring to FIG. 1, a block diagram showing the configuration of a cellular telephone system of the prior art is provided. The system of FIG. 1 includes a main cellular telephone transceiver unit 10, a cellular telephone handset 12, a speaker-phone unit 14, a power source 16, and an interconnecting wiring harness 18. Handset 12 includes a keypad, earpiece, and mouthpiece (not shown in FIG. 1) as would be found in a conventional cellular telephone handset. Speaker-phone unit 14 includes a speaker and microphone (also not shown in FIG. 1), as would be found in conventional speaker-phones.

Figure 2:
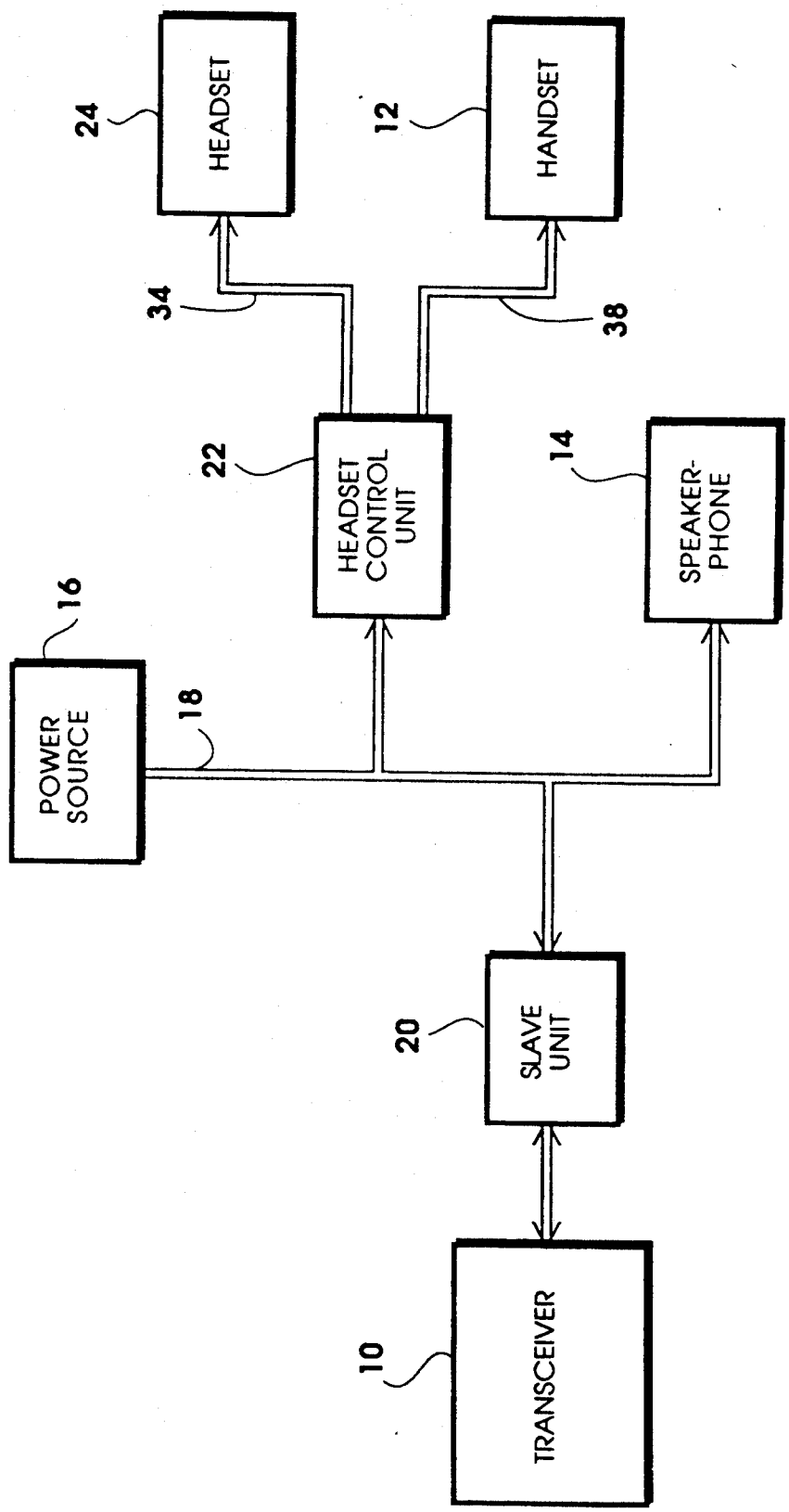
FIG. 2 is a block diagram showing a configuration of a cellular telephone system in accordance with one embodiment of the present invention.

Turning now to FIG. 2, a block diagram showing the configuration of a cellular telephone system in accordance with one embodiment of the present invention is provided. Elements which are the same as the system of FIG. 1 have retained like reference numerals. In the system of FIG. 2, a slave unit 20 is inserted in the path between transceiver 10 and wiring harness 18. A headset control unit 22 is coupled to wiring harness 18 in place of handset 12, which is instead coupled to headset control unit 22. The connection of speaker-phone 14 remains unchanged from the system of FIG. 1. Finally, the system of FIG. 2 includes a headset 24 which is also coupled to headset control unit 22.

Figure 3:
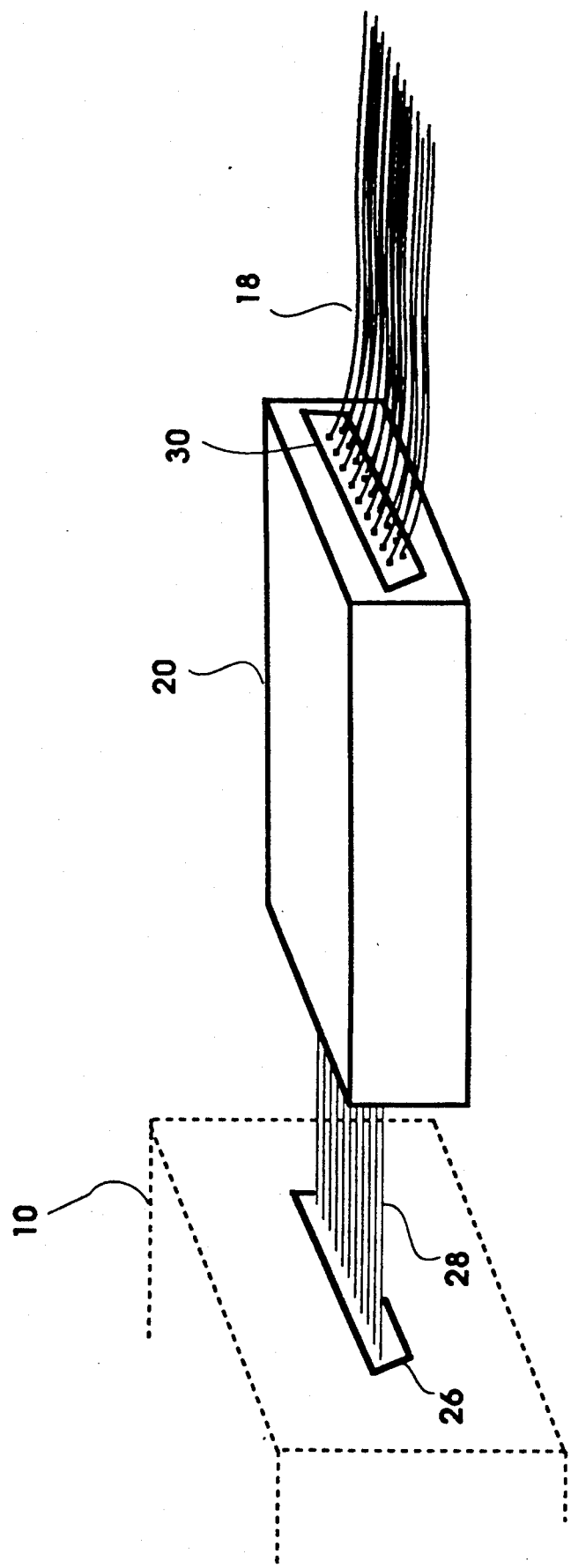
FIG. 3 is a diagram showing a slave unit from the system of FIG. 2.

FIG. 3 is a more detailed illustration of slave unit 20 of FIG. 2. Wiring harness 18 in the system of FIG. 1 is coupled to transceiver 10 (shown in phantom in FIG. 3) via a multiple-pin modular connector, such as a commercially-available DB25 type connector or the like. As shown in FIG. 3, slave unit 20 of FIGS. 2 and 3 is coupled to transceiver 10 in place of wiring harness 18 via a modular connector and a ribbon cable designated as 26 and 28, respectively, in FIG. 3. Wiring harness 18, shown only partially in FIG. 3, is coupled to slave unit 20 via a modular connector 30 identical to connector 26.

It is to be understood that although wiring harness 18 contains multiple conductors, each component coupled to wiring harness 18 may receive only a subset of all of the conductors in the wiring harness. In the system of FIGS. 2 and 3, for example, the portion of wiring harness 18 which connects via connector 26 and ribbon cable 28 with slave unit 20 may contain 25 conductors, while headset control unit 22 and speaker-phone 14 may each receive only a subset of these 25 conductors. It is important to note, however, that wiring harness 18 is identical in the systems of FIGS. 1 and 2.

Figure 4:
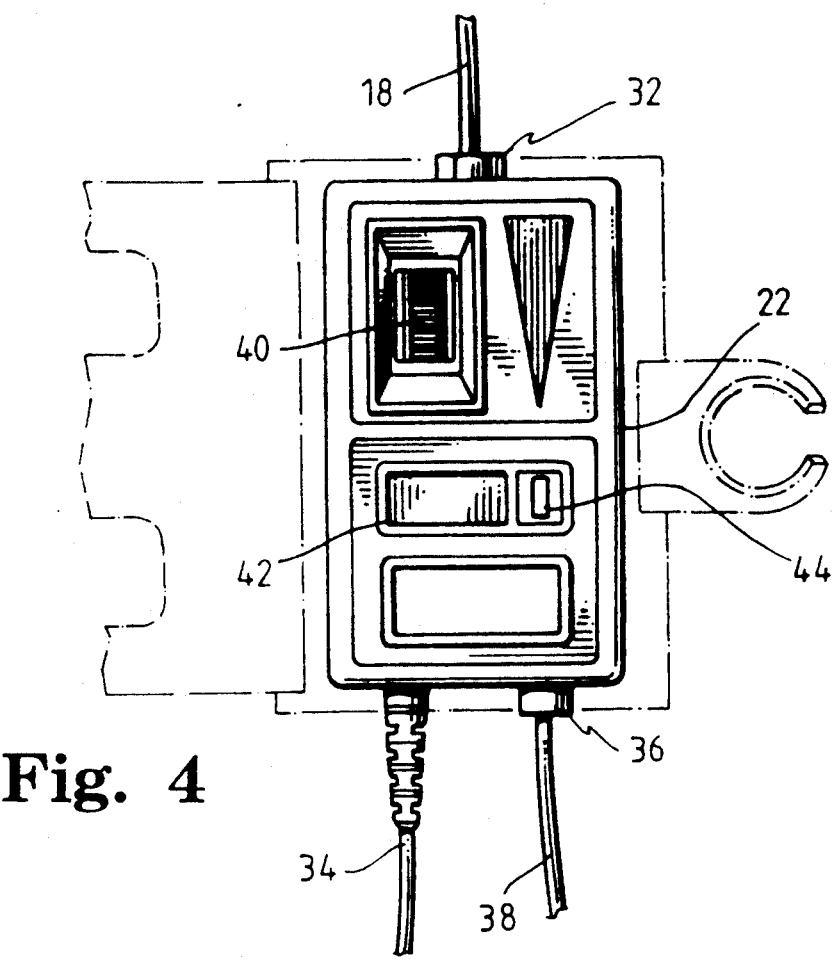
FIG. 4 is a diagram showing the headset control unit of FIG. 2.

Turning now to FIG. 4, headset control unit 22 from the system of FIG. 2 is shown. Wiring harness 18, only partially shown in FIG. 4 is coupled to headset control unit 22 via a conventional modular connector designated as 32 in FIG. 4. Headset cable 34 connects control unit 22 with headset 24, not shown in FIG. 4. Handset 12 (not shown in FIG. 4 is coupled to headset control unit 22 via a handset cable 38 and a modular connector 36. Headset control unit 22 includes a volume control dial 40, a momentary-contact pushbutton 42, and a light-emitting diode (LED) 44. Pushbutton 42 toggles the headset apparatus of the present invention on and off, in a manner to be hereinafter described. When the headset apparatus is turned on, LED 44 lights and volume control dial 40 controls the volume of sound produced by the headset apparatus earpiece, not shown in FIG. 4.

Figure 7:
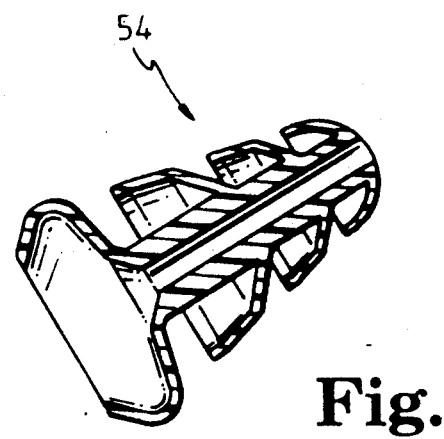
FIG. 7 is a diagram showing an eartip which may be used with the headset of FIGS. 5 and 6.

A top view of a headset 24 in accordance with the presently disclosed embodiment of the invention is shown in FIG. 5. Headset cable 34 connects headset 24 with headset control unit 22 as previously described with reference to FIG. 4. Headset 24 includes an earpiece 46 having a stiff but flexible ear clip 48 pivotally connected thereto. Headset 24 further includes a flexible microphone boom 50 having a microphone capsule 52 disposed on its distal end. A side view of headset 24 is shown in FIG. 6. Headset 24 is worn with earpiece 46 resting against the concha of the user's ear, and with ear clip 48 curved behind the wearer's auricle. A thin, foam-rubber earpiece cover, not shown in the Figures, may be fitted around earpiece 46 to provide padding between earpiece 46 and the wearer's concha. Alternatively, earpiece 46 may be inserted into an ear-tip 54, shown in FIG. 7, and headset 24 worn with eartip 54 inserted partially in the acoustic meatus of the wearer's external ear.

Ear-clip 48 is pivotally attached to earpiece 46 such that earpiece 48 may be rotated around the axis of earpiece 46, as indicated by arrows 56 in FIG. 5, and also rotated around a radius of earpiece 46, as indicated by arrow 58 in FIG. 5.

With earpiece 46 disposed against the wearer's concha and affixed via ear clip 48 behind the wearer's auricle, flexible microphone boom 50 extends from the wearer's ear, across the wearer's cheek, such that microphone capsule 52 on the distal end of boom 50 is positioned in front of the wearer's mouth.

Referring to FIGS. 5 and 6, microphone capsule 52 houses a conventional electret microphone, such as the commercially-available WM-65A 102A Electret Condenser Microphone or the like, not shown in the Figures. Capsule 52 has two acoustical port holes at the points labeled 60 and 62 FIGS. 5 and 6. Acoustical port hole 60 is disposed on the distal end of capsule 52 such that when capsule 52 is positioned in front of the wearer's mouth, port hole 60 is on the side of capsule 52 closest to the wearer's mouth. Acoustical port hole 62 is positioned on the proximal end of capsule 62, such that when the capsule is properly positioned, port hole 62 faces away from the user's mouth. The aforementioned electret microphone housed in capsule 52 is disposed such that acoustical pressure waves impinge on the microphone from two directions, through each of the acoustical port holes.

Ambient noise cancellation is achieved with the capsule configuration just described as follows: Ambient noise (such as passing traffic, engine drone, radio noise, or wind) enters capsule 52 via both portholes, 60 and 62. Since these acoustical signals enter the capsule from both directions, the pressure applied on each side of the internal electret microphone by these signals is roughly equal; thus, no pressure differential between the two sides of the microphone is established, the microphone's membrane is not displaced, and thus no sound is transmitted. Acoustical waves resulting from the wearer's vocalizations, on the other hand, enter capsule 52 primarily via acoustical port hole 60, and not, for the most part, through acoustical port hole 62. Thus, the pressure on the internal microphone as a result of pressure waves entering via port hole 60 is greater than pressure on the internal microphone resulting from pressure waves entering via port hole 62. The microphone's membrane is displaced by this resulting pressure differential, and the wearer's vocalizations are registered and converted to electrical signals.

Figure 8:
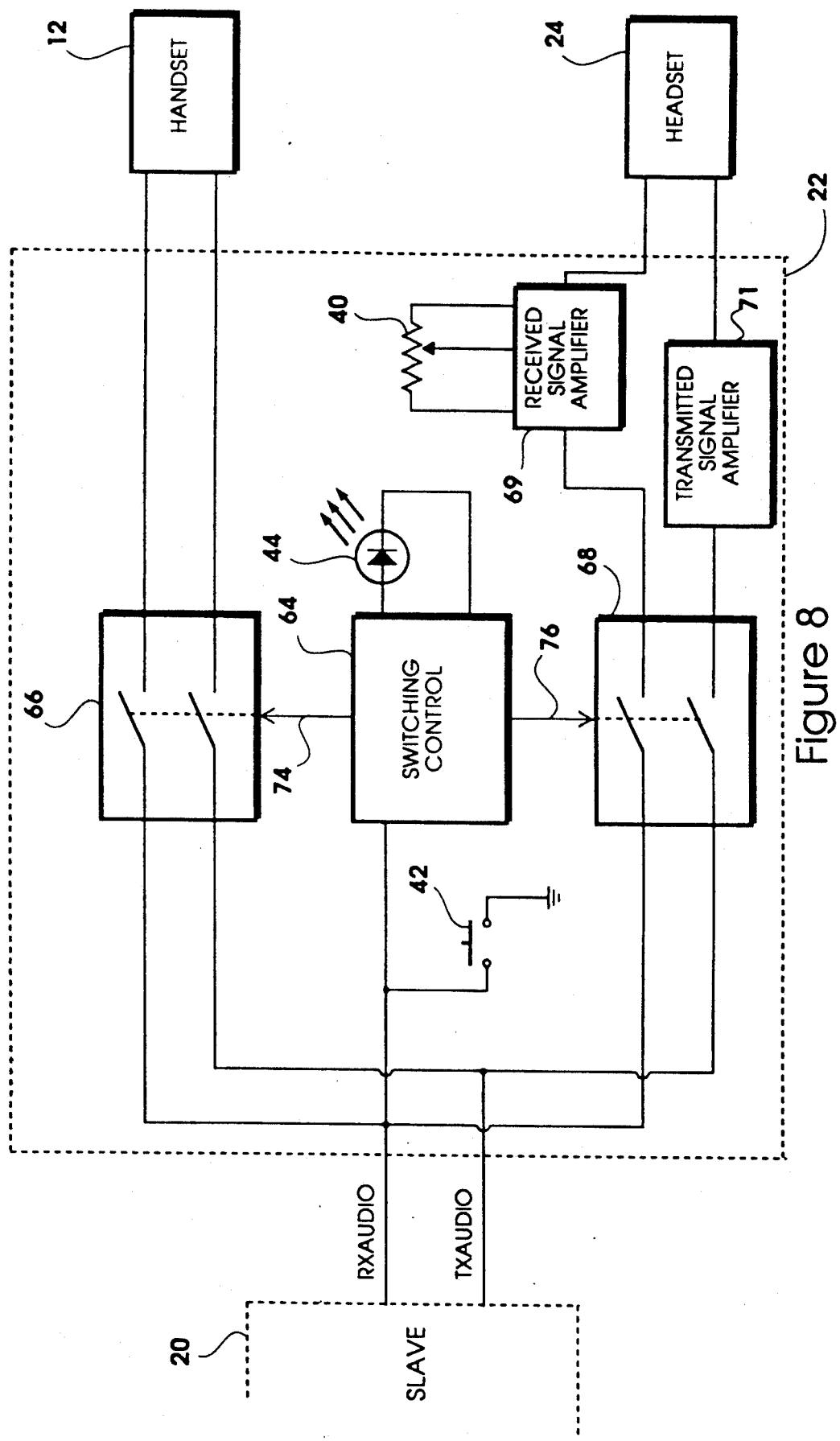
FIG. 8 is a block diagram of the headset control unit of the system of FIG. 2.

Turning now to FIG. 8, a block diagram of headset control unit 22 is shown, along with blocks representing handset 12 and headset 24. Headset control unit 22 comprises pushbutton 42 and LED 44, previously described with reference to FIG. 4, as well as switching control circuitry 64 and two pairs of analog switches, designated respectively as 66 and 68 in FIG. 8. Headset control unit 22 further comprises volume control resistor 40 and transmit signal amplifier circuitry 71. As shown in FIG. 8, two signals are applied to headset control unit 22 from slave unit 20. These signals are designated in FIG. 8 as RXAUDIO and TXAUDIO. The RXAUDIO line carries an AC voice signal which is applied to the receiver of the handset and/or headset earpiece. The TXAUDIO line carries an AC voice signal which originates at the handset and/or headset microphone.

In addition to the AC voice signal conducted on the RXAUDIO line, however, slave unit 20 of the present invention also provides a DC component to the signal conducted on the RXAUDIO line between slave unit 20 and headset control unit 22. As shown in FIG. 8, the RXAUDIO line is applied to switch pairs 66 and 68, as well as to switching control circuit 64. The level of the DC component of the signal on the RXAUDIO line indicates to the switching control circuit 64 whether the handset and/or headset is to be activated and coupled to the RXAUDIO and TXAUDIO voice signal lines. The DC component of the signal on the RXAUDIO line is set to one of three possible voltages by slave unit 20, as will be hereinafter described. When slave unit 20 sets the DC component of the RXAUDIO signal at the lowest of these three possible voltage levels, switching control circuit 64 asserts the signal on output control line 74 in FIG. 8, and not control line 76, causing the pair of switches 66 to close, while the pair of switches 68 remains opened, thereby coupling handset 12, but not headset 24, to the RXAUDIO and TXAUDIO voice lines. When slave unit 20 sets the DC component of the RXAUDIO signal to the middle of the three possible voltage levels, switching control circuit 64 asserts the signals on both output control lines 74 and 76, causing both switch pairs 66 and 68 to close, thereby coupling both handset 12 and headset 24 to the RXAUDIO and TXAUDIO signal lines. Finally, when slave unit 20 sets the DC component of the RXAUDIO signal to the highest of its three possible values, switching control circuit 64 asserts the signal on output control line 76 only, thereby coupling headset 24 to the RXAUDIO and TXAUDIO lines but keeping handset 12 isolated from the RXAUDIO and TXAUDIO lines.

Headset control unit 22 further includes a received signal amplifier circuit 69 for amplifying the RXAUDIO voice signal applied to the earpiece of headset 24. Amplifier circuit 69 has coupled thereto a variable resistor 40 which functions in a conventional manner to control the volume of sound produced by the earpiece of headset 24. Finally, headset control unit 22 includes transmitted signal amplifier circuitry 71 which amplifies the voice signal produced from the microphone of headset 24 in a conventional manner.

Figure 9:
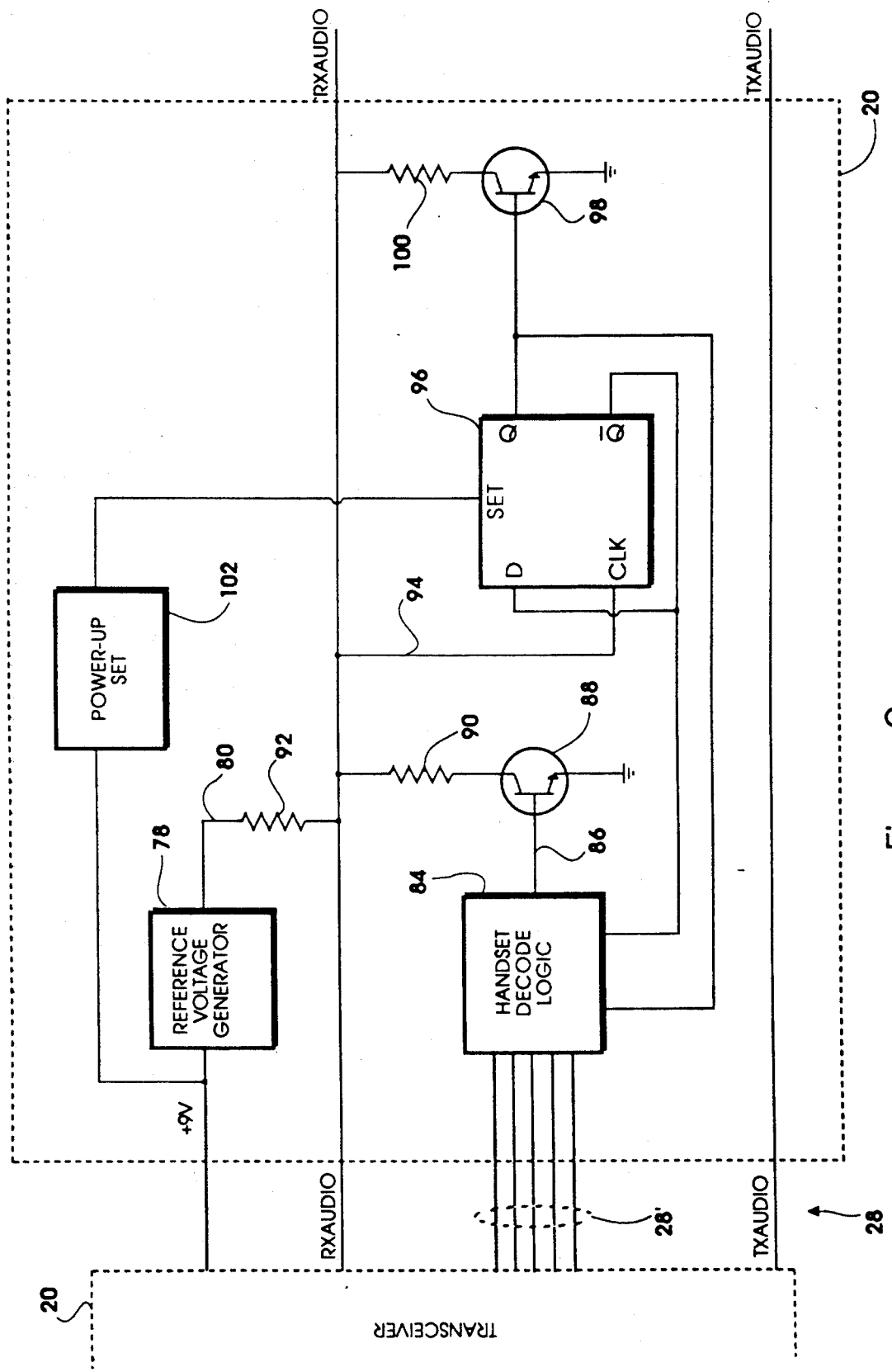
FIG. 9 is a block diagram of the slave unit of the system of FIG. 2.

FIG. 9 is a block diagram of slave unit 20. Recall from FIG. 2 that slave unit 20 is coupled to transceiver 10 via ribbon cable 28. In FIG. 9, certain of the conductors in ribbon cable 28 are separately identified, and collectively identified by reference numeral 28. In particular, one of the conductors in ribbon cable 28 is designated as +9 V in FIG. 9. This is a positive nine-volt signal provided by the transceiver. The +9 V signal is applied to reference voltage generator circuit 78, which produces therefrom a positive reference voltage on output line 80. Output line 80 is coupled to the RXAUDIO line via resistor 92. Capacitor 82 blocks any DC voltage on the RXAUDIO line from passing from transceiver 10 to slave unit 20 on the RXAUDIO line, leaving slave unit 20 in complete control of the DC component of the signal provided on the RXAUDIO line to headset control unit 22. Handset decode logic 84 receives several ribbon cable lines, designated collectively as 28' from transceiver 10. The signals on lines 28' are indicative of whether handset 12 is turned on. When the signals on the lines 28' indicate that handset 12 is turned on, handset decode logic 84 asserts the signal on its output line 86. Line 86 is coupled to the base of transistor 88, such that when handset 12 is turned on and output 86 is asserted, transistor 88 conducts, thereby reducing the DC voltage on the RXAUDIO line by an amount determined by the ratio of the resistances of resistors 90 and 92.

With reference to FIGS. 8 and 9, pushbutton 42 in headset control unit 22 is coupled between the RXAUDIO line and ground. Thus, when pushbutton 42 is depressed, the RXAUDIO line is momentarily coupled to ground. This momentary drop in the RXAUDIO DC voltage is propagated on the RXAUDIO line to slave unit 20. In slave unit 20, the RXAUDIO line is coupled, via line 94 to the clock (CLK) input of a D Flip-Flop (DFF) 96. The momentary drop in the RXAUDIO DC voltage thus toggles the outputs Q and $\overline{Q}$ of DFF 96. When the output Q of DFF 96 is high, transistor 98 is rendered conductive, and the DC voltage on the RXAUDIO line is reduced by an amount determined by the ratio of resistances of resistors 92 and 100. The Q and $\overline{Q}$ outputs of DFF 96 are also provided as inputs to handset decode logic 84.

In the presently disclosed embodiment of the invention, the resistance of resistor 90 is more than twice that of resistor 100, so that the voltage of the DC component of the signal on the RXAUDIO line is lower when transistor 98 is rendered conductive than when transistor 88 is rendered conductive.

Thus, there are three possible DC voltage levels which may be applied to the RXAUDIO line by slave unit 20. When the cellular telephone system is first powered-up, power-up circuit 102 coupled to the +9V conductor of ribbon cable 28 ensures that DFF 96 is set (its Q output asserted) so that transistor 98 is asserted. This corresponds to the lowest of the three possible voltage levels on the RXAUDIO signal provided to headset control unit 22. When pushbutton 42 in headset control unit is first depressed after power-up, this toggles the outputs of DFF 96 (the Q output deasserted and the $\overline{Q}$ output asserted), rendering transistor 88 conductive and transistor 98 non-conductive. This corresponds to the middle of the three possible voltage DC voltage levels on the RXAUDIO signal provided to headset control unit 22. Thereafter, when pushbutton 42 is depressed, the outputs of DFF 96 are reversed, alternately rendering transistor 98 then transistor 88 conductive. If handset 12 is turned off, while headset 24 remains on, neither transistor 88 nor transistor 98 is conductive; this corresponds to highest of the three possible DC voltage levels of the RXAUDIO signal provided to headset control unit 22.

The interaction of slave unit 20 and headset control unit 22 described above with reference to FIGS. 8 and 9 results in "handset primacy" operation of the cellular telephone system; that is, normal operation of handset 12 is not affected by the presence of the headset apparatus of the present invention. When the system is first powered up, handset 12 is automatically coupled to the RXAUDIO and TXAUDIO lines, through the operation of power-up set circuit 102 previously described with reference to FIG. 9. Thereafter, headset 24 is alternately coupled and decoupled with the RXAUDIO and TXAUDIO lines each time pushbutton 42 is depressed; this has no effect, however, on the connection of handset 12 to the RXAUDIO and TXAUDIO lines. In addition, since slave unit 20 is disposed along the path between transceiver 10 and handset 12, operation of headset 24 does not depend upon handset 12 being connected to the RXAUDIO and TXAUDIO lines.

Figure 10:
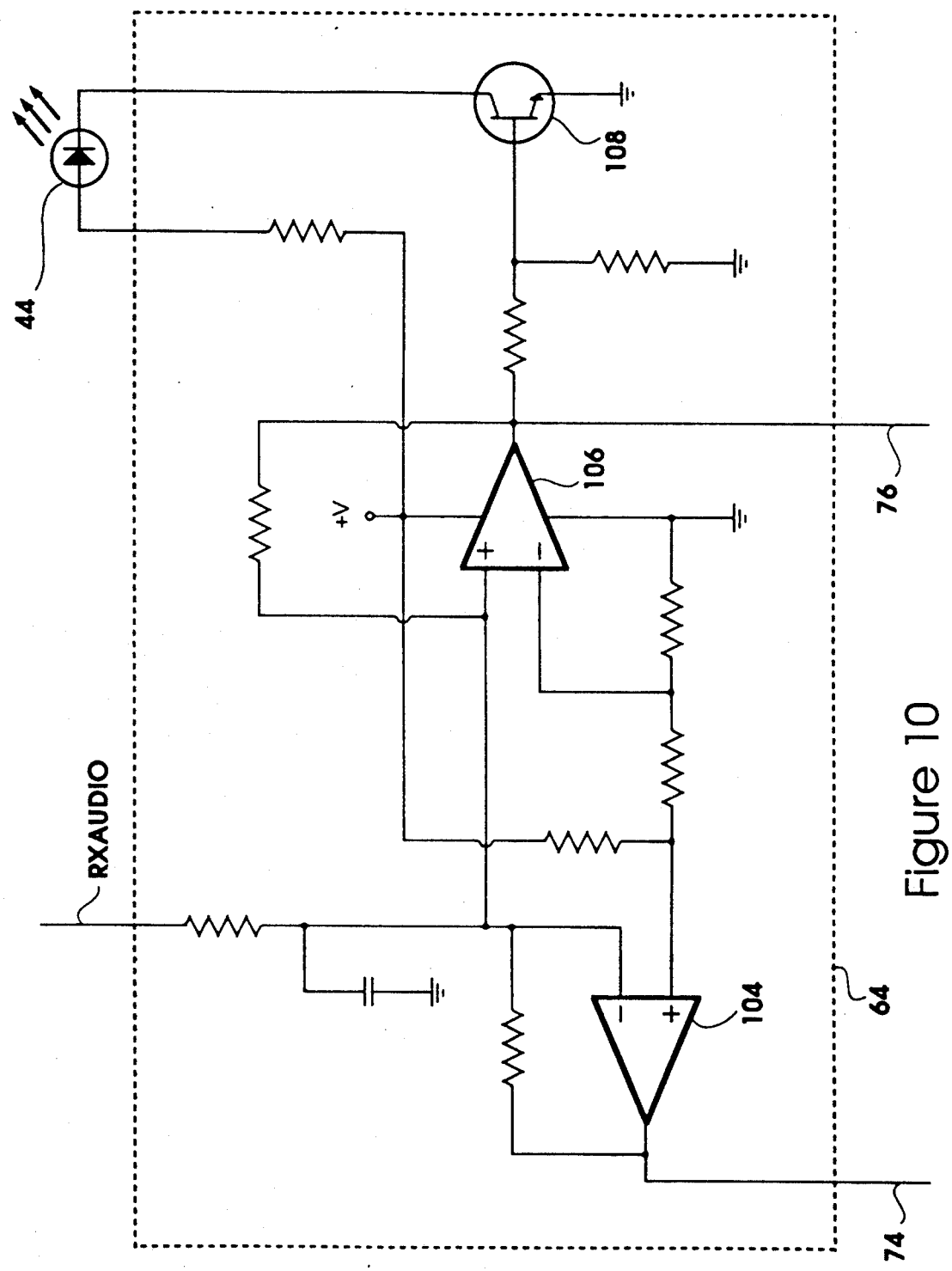
FIG. 10 is a schematic diagram of the switching control circuit of FIG. 8.

FIG. 10 is a more detailed schematic diagram of switching control circuit 64 of FIG. 8 in accordance with the presently disclosed embodiment of the invention. As shown in FIGS. 8 and 10, switching control circuit 64 receives the RXAUDIO signal provided from slave unit 20. As will be appreciated by one of ordinary skill in the art of circuit design, operational amplifiers 104 and 106 in switching control circuit 64 function to discriminate between the three possible DC voltage levels which may applied to the RXAUDIO line by slave unit 20. When the DC RXAUDIO voltage is at the lowest of its three possible values (i.e. when transistor 98 in FIG. 9 is rendered conductive), operational amplifier 104 will produce a positive voltage signal on its output line 74. As previously described with reference to FIG. 8, the signal on line 74 functions to control the opening and closing of the pair of analog switches 66. When switches 66 are closed due to a positive voltage signal on line 74, handset 12 is coupled to the RXAUDIO and TXAUDIO lines.

When the DC RXAUDIO voltage is at the highest of its three possible values (i.e. when neither transistor 88 nor transistor 98 in FIG. 9 is rendered conductive), operational amplifier 106 in FIG. 10 will produce a positive voltage signal on its output line 76. As previously described with reference to FIG. 8, the signal on line 76 functions to control the opening and closing of the pair of analog switches 68. When switches 68 are closed due to a positive voltage signal on line 76, headset 24 is coupled to the RXAUDIO and TXAUDIO lines.

Finally, when the DC RXAUDIO voltage is in the middle of its three possible values, (i.e. when transistor 88 in FIG. 9 is rendered conductive), both operational amplifier 104 and operational amplifier 106 will produce positive voltage signals on their respective output lines 74 and 76, closing both switch pairs 66 and 68.

With continued reference to FIG. 10, the output signal on line 76 is also received at the base of transistor 108. When operational amplifier 106 produces a positive output voltage on line 76, transistor 108 is rendered conductive, and LED 44 is activated. Since a positive signal on control line 76 corresponds to headset 24 being coupled to the RXAUDIO and TXAUDIO lines, LED 44 lights up whenever headset 24 is coupled to RXAUDIO and TXAUDIO.

Figure 11A:
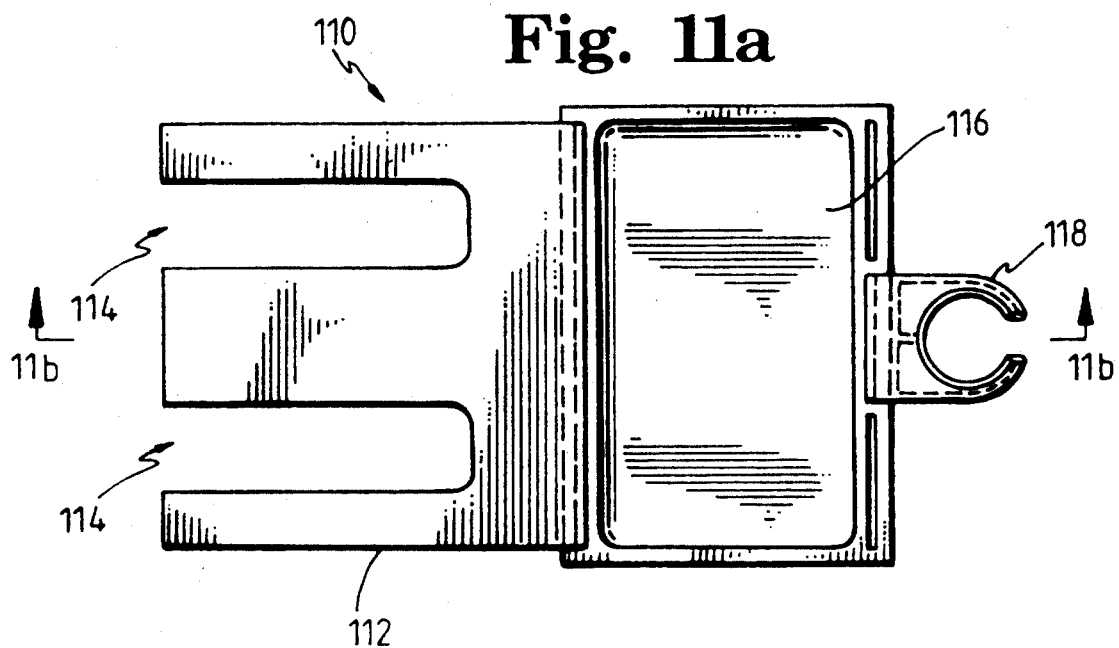
FIGS. 11a, 11b, and 11c are top, side, and bottom views of a mounting plate in accordance with the present invention.
Figure 11B:
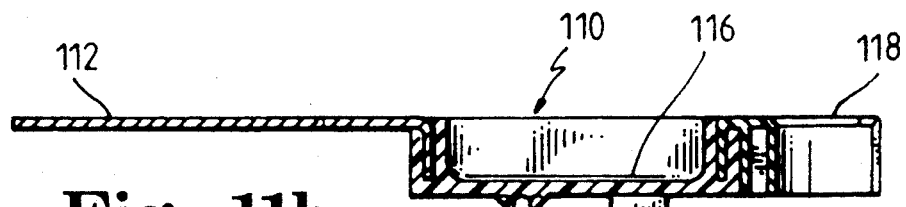

FIGS. 11a and 11b are top and side views, respectively, of a headset control unit mounting tray 110 in accordance with the presently disclosed embodiment of the invention. To install mounting tray 110 in an existing cellular phone system, flat protruding portion 112 of mounting tray 110 is inserted between the cradle and cradle mount of the existing system. Slots 114 are provided in flat protruding portion 112 to allow clearance for screws that attach the cradle to the cradle mount. Recessed portion 116 of mounting tray 112 is sized to accept headset control unit 22. In one embodiment of the present invention, headset control unit 22 is affixed into recessed portion 116 by means of Velcro TM strips or the like (not shown in the Figures) disposed on the bottom of control unit 22 and the bottom of recessed portion 116. Mounting tray 110 also includes retaining ring 118 for holding headset 24 when not in use.

Figure 11C:
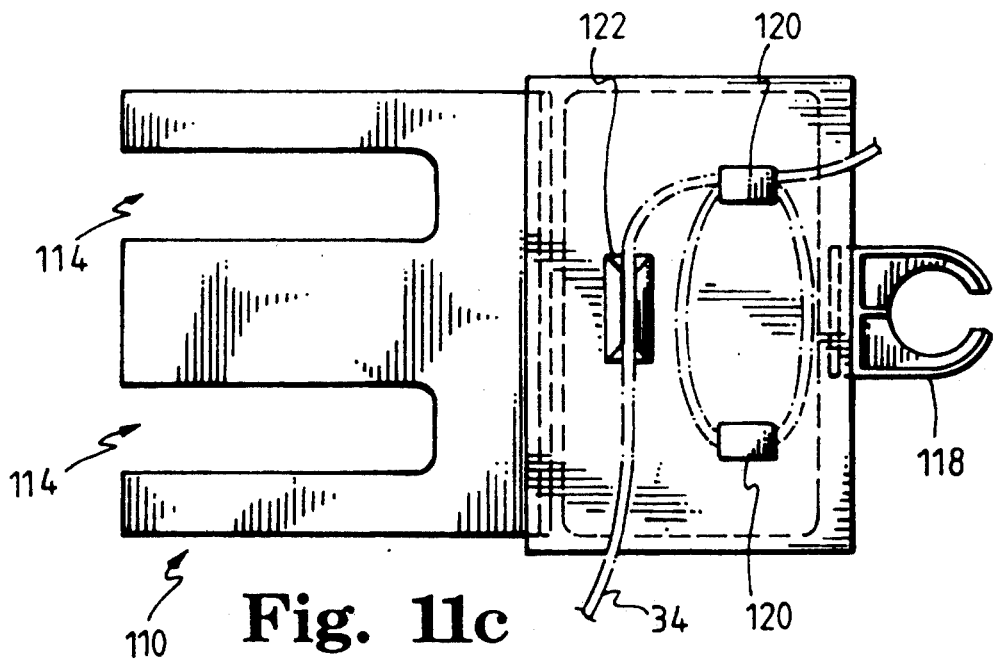
Figure 12:
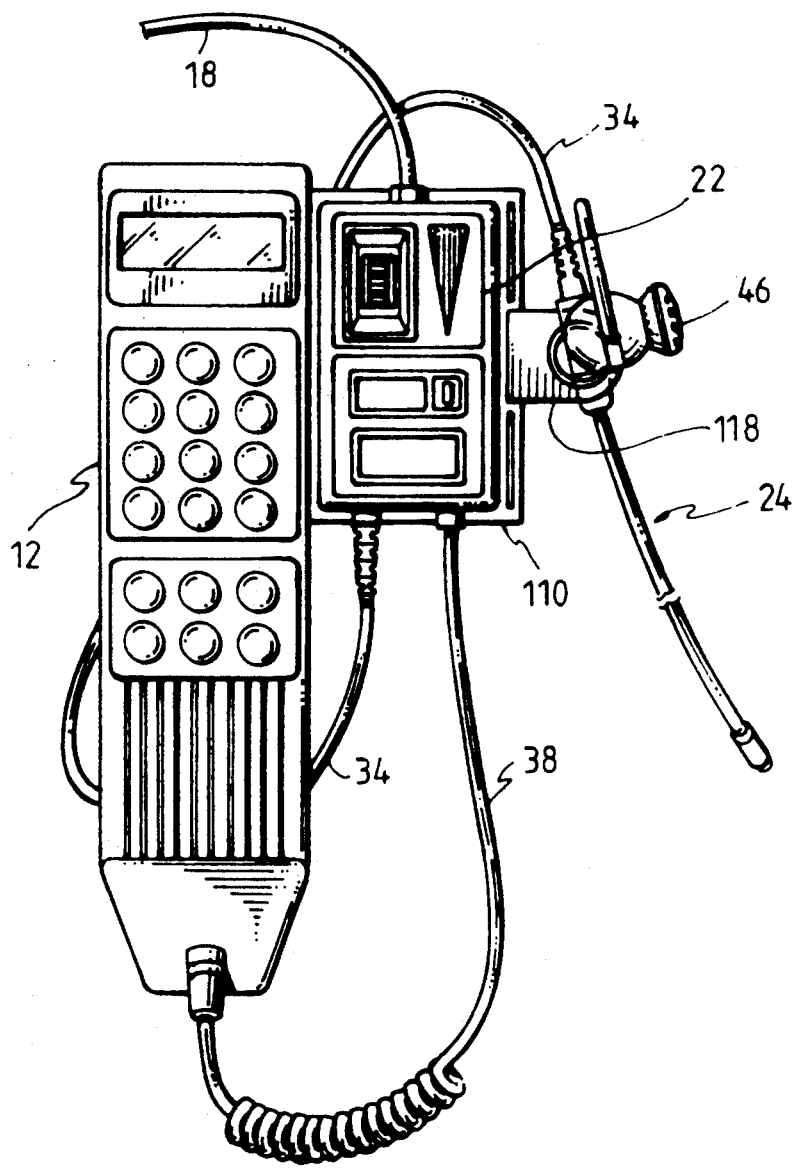
FIG. 12 is a top view of the handset, control unit, and headset of FIG. 2.

FIG. 11c is a bottom view of mounting tray 110. On the underside of mounting tray 110 are disposed two wire storage hooks 120 and a grooved wire clamp 122. Hooks 120 and clamp 122 function to store any excess length of headset cable 34 that is not required during normal operation of the present invention. Excess length of headset cable 34 is wrapped around storage hooks 120 as shown in FIG. 11c, and cable 34 is secured in place by grooved clamp 122.

FIG. 11d is a top view showing the arrangement of handset 12, headset 24, mounting plate 110, and headset control unit 22.

From the foregoing description, it should be apparent that a cellular telephone headset apparatus has been disclosed which provides safe, private, and comfortable hands-free operation of a cellular telephone. Although a specific embodiment of the present invention has been described in detail, it is to be understood that various alterations, modifications, or substitutions can be made therein without departing from the spirit and scope of the present invention, as defined in the appended claims.

What is claimed is:

1. A cellular telephone system comprising:
   a cellular telephone transceiver;
   a receive line originating from said transceiver, for carrying AC voice signals from said transceiver;
   a transmit the terminating at said transceiver, for carrying AC voice signals to said transceiver;
   a cellular telephone handset having a handset receiver and a handset microphone;
   a headset having a headset receiver and a headset microphone;
   a slave unit coupled to said receive line and said transmit line and adapted to selectively apply a low, medium, and high DC voltage level to said receive line;
   a headset control unit coupled to said receive line and said transmit line and responsive to said DC voltage level to selectively couple said handset and said headset to said receive line and said transmit line;
   wherein said headset control unit is responsive to said low DC voltage level to couple only said handset to said transmit and receive lines, and is responsive to said medium DC voltage level to couple said handset and said headset to said transmit and receive lines, and is responsive to said high DC voltage level to couple only said headset to said transmit and receive lines.

2. The cellular telephone system of claim 1, wherein said headset control unit comprises:
a momentary contact pushbutton for momentarily grounding said receive line;
and wherein said slave unit is responsive to said momentary grounding of said receive line to toggle between applying said low DC voltage level and said medium DC voltage level to said receive line.

3. The cellular telephone system of claim 1, further comprising a DC blocking capacitor disposed in series along said receive line for preventing said DC voltage level from being applied to said transceiver.

4. The cellular telephone system of claim 1, wherein said slave unit is adapted to apply said low DC voltage level to said receive line when said cellular telephone system is initially turned on.

5. The cellular telephone system of claim 1, wherein said slave unit is adapted to apply said high DC voltage level to said receive line only when said handset is turned off.

6. A cellular telephone system comprising:
a cellular telephone transceiver;
a receive line originating from said transceiver, for carrying AC voice signals from said transceiver;
a transmit line terminating at said transceiver, for carrying AC voice signals to said transceiver;
a cellular telephone handset having a handset receiver and a handset microphone;
a headset having a headset receiver and a headset microphone;
a slave unit coupled to said receive line and said transmit line and adapted to apply a coding signal to said receive line;
a headset control unit coupled to said receive line and said transmit line and responsive to said coding signal to cause said handset and said headset to be selectively coupled to said receive line and said transmit line.

7. The cellular telephone system of claim 6, wherein said coding signal comprises one of a plurality of identifiable codes, a first of said identifiable codes indicating that only said handset is to be coupled to said transmit and receive lines, a second of said identifiable codes indicating that said handset and said headset is to be coupled to said transmit and receive lines, and a third of said identifiable codes indicating that only said headset is to be coupled to said transmit and receive lines.

8. The cellular telephone system of claim 7, wherein said identifiable codes are distinct DC voltage levels.

9. The cellular telephone system of claim 6, further comprising blocking means for preventing application of said coding signal to said transceiver.

10. The cellular telephone system of claim 7, wherein said slave unit applies said first identifiable code to said receive line when said telephone system is turned on.

11. The cellular telephone system of claim 10, wherein said slave unit applies said third identifiable code to said receive line only when said handset is turned off.

* * * * *

UNITED STATES PATENT AND TRADEMARK OFFICE
CERTIFICATE OF CORRECTION

PATENT NO. : 5,191,602
DATED : March 2, 1993
INVENTOR(S) : Paul L. Regen and Mary Tseu It is certified that error appears in the above-indentified patent and that said Letters Patent is hereby corrected as shown below:

Column 8, line 48, delete "the", insert --line--.

Signed and Sealed this

Twenty-first Day of June, 1994

Attest:

BRUCE LEHMAN

*Attesting Officer*     Commissioner of Patents and Trademarks